United States Patent
Hang et al.

(10) Patent No.: US 9,906,059 B2
(45) Date of Patent: Feb. 27, 2018

(54) CHARGE AND DISCHARGE MANAGEMENT SYSTEM AND MOVABLE POWER SOURCE USING THE SAME

(71) Applicant: Silergy Semiconductor Technology (Hangzhou) LTD, Hangzhou, ZheJiang Province (CN)

(72) Inventors: Kailang Hang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 218 days.

(21) Appl. No.: 14/824,993

(22) Filed: Aug. 12, 2015

(65) Prior Publication Data

US 2016/0056657 A1   Feb. 25, 2016

(30) Foreign Application Priority Data

Aug. 20, 2014  (CN) .......................... 2014 1 0412307

(51) Int. Cl.
*H02J 7/00* (2006.01)
*H02M 3/158* (2006.01)

(52) U.S. Cl.
CPC ........... *H02J 7/0068* (2013.01); *H02J 7/0072* (2013.01); *H02M 3/1582* (2013.01)

(58) Field of Classification Search
CPC .................................................. H02J 7/0068
USPC ....................................................... 320/128
See application file for complete search history.

(56) References Cited

U.S. PATENT DOCUMENTS

| 7,176,667 | B2* | 2/2007 | Chen ....................... H02M 1/44 323/282 |
| 8,450,979 | B2 | 5/2013 | Kerr et al. |
| 8,610,405 | B2* | 12/2013 | Yamazaki ............. H02J 7/0052 320/134 |
| 2004/0239299 | A1* | 12/2004 | Vinciarelli .......... H02M 3/1582 323/282 |
| 2008/0231233 | A1 | 9/2008 | Thornton |
| 2009/0309566 | A1* | 12/2009 | Shiu ........................ H02M 3/07 323/283 |
| 2010/0165686 | A1* | 7/2010 | Matzberger ........... H02M 7/219 363/127 |

(Continued)

FOREIGN PATENT DOCUMENTS

| CN | 103378616 A | 10/2013 |
| CN | 103715886 A | 4/2014 |

*Primary Examiner* — Tessema Kebede
(74) *Attorney, Agent, or Firm* — Michael C. Stephens, Jr.

(57) ABSTRACT

An apparatus can include: (i) a first switch coupled to an external interface and an inductor; (ii) a second switch coupled to ground and a common node between the first switch and the inductor; (iii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; and (iv) a chargeable battery coupled to the fourth switch, where the power converter is configured to provide a current to the battery when the external interface is coupled to an external power supply, and where the power converter is configured to provide a current to a load when the external interface is coupled to the load.

11 Claims, 5 Drawing Sheets

(56) References Cited

U.S. PATENT DOCUMENTS

| | | | |
|---|---|---|---|
| 2011/0115295 A1* | 5/2011 | Moon | H02J 3/32 307/65 |
| 2014/0152239 A1 | 6/2014 | Yao et al. | |
| 2014/0203763 A1 | 7/2014 | Zhao et al. | |

* cited by examiner

CHARGE AND DISCHARGE MANAGEMENT SYSTEM AND MOVABLE POWER SOURCE USING THE SAME

RELATED APPLICATIONS

This application claims the benefit of Chinese Patent Application No. 201410412307.2, filed on Aug. 20, 2014, which is incorporated herein by reference in its entirety.

FIELD OF THE INVENTION

The present disclosure generally relates to the field of power electronics, and more particularly to a charge and discharge management system, along with a movable power supply.

BACKGROUND

Portable electronic products, such as cellphones and wearable electronic devices are in increasingly wide uses. However, power losses may increase as such portable electronic products have more functionality. Therefore, the service time of portable electronic products may be limited by the battery level, so as to cause adverse effects on user experience. A movable power source is a portable charger with both power supply and charging functions such a movable power source can be used to charge a portable electronic product whenever and wherever possible, or to supply power in a standby state, in order to prolong service time. Movable power source typically include a power supply circuit and an additional battery, such as a lithium battery.

SUMMARY

In one embodiment, an apparatus can include: (i) a first switch coupled to an external interface and an inductor; (ii) a second switch coupled to ground and a common node between the first switch and the inductor; (ii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; and (iv) a chargeable battery coupled to the fourth switch, where the power converter is configured to provide a current to the battery when the external interface is coupled to an external power supply, and where the power converter is configured to provide a current to a load when the external interface is coupled to the load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
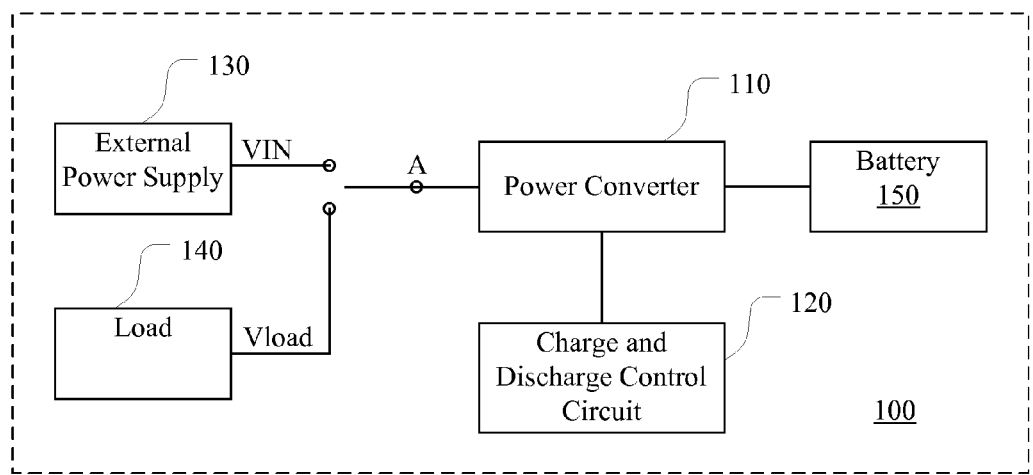
FIG. 1 is a schematic block diagram of an example battery bi-directional charge and discharge system applied in a movable power source.
Figure 2:
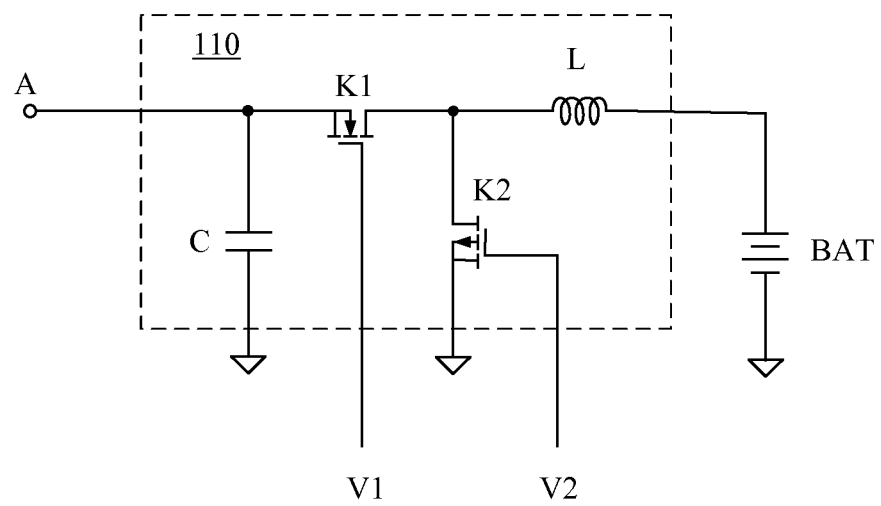
FIG. 2 is a schematic block diagram of an example power converter in an example battery bi-directional charge system.

Referring now to FIGS. 1 and 2, shown are schematic block diagrams of an example battery bi-directional charge and discharge system applied in a movable power source (100), and an example power converter. Power converter 110 can include switch K1 and inductor L coupled series between external interface A (which can couple with external power supply 130 or load 140) and battery (BAT) 150 of the portable power source. Also, switch K2 can connect between ground and a common node of switch K1 and inductor L, and capacitor C can connect between external interface A and ground.

When external interface A is coupled with external power supply 130, power converter 110 may operate in a buck mode. In such a case, external interface A can be configured as an input terminal of the power converter, the battery may be configured as an output terminal of power converter 110, and a voltage (VIN) from the connected power supply can charge the battery by operating the power converter in the buck mode. When external interface A is coupled with load 140, power converter 110 may operate in a boost mode. In this case, external interface A can be configured as the output terminal of power converter 110, and the terminal of the battery that couples with the power converter may be configured as the input terminal of power converter 110. Here, the battery may charge load 140 by operating the power converter in the boost mode.

For charging and discharging the battery through such a power converter, control circuit 120 may have a relatively simple structure. However, power converter 110 may operate in buck mode when charging the battery, and in boost mode when charging the load. Thus, the battery voltage of the movable power source should be lower than the supply voltage (power supply voltage VIN) of power converter 110 in the buck mode, and also be lower than the load voltage (voltage Vload) of the power converter in the boost mode. Because of these considerations, there may be circuit limitations once the voltage of the battery and external interface A changes. Moreover, if there are two or more batteries in the movable power source instead of one battery, the voltage range may be relatively large. As a result, it may be difficult to determine the relationship between the input and output voltages of the power converter.

In one embodiment, an apparatus can include: (i) a first switch coupled to an external interface and an inductor; (ii) a second switch coupled to ground and a common node between the first switch and the inductor; (ii) a third switch coupled to ground and a common node between the inductor and a fourth switch, where the inductor and first, second, third, and fourth switches form a power converter; (iii) a charge and discharge control circuit coupled to the power converter, and being configured to control the first, second, third, and fourth switches; and (iv) a chargeable battery coupled to the fourth switch, where the power converter is configured to provide a current to the battery when the external interface is coupled to an external power supply, and where the power converter is configured to provide a current to a load when the external interface is coupled to the load.

Figure 3:
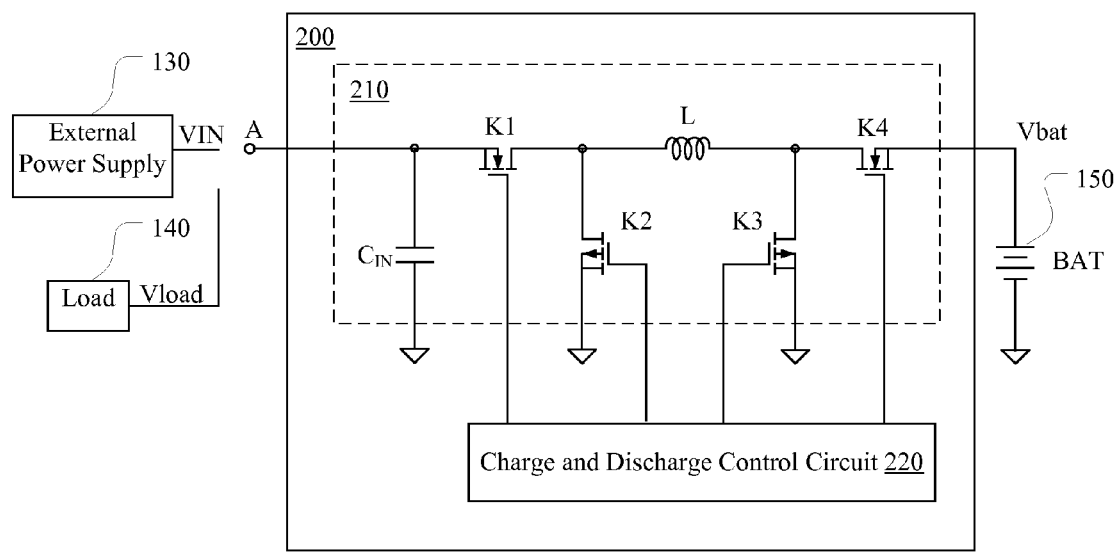
FIG. 3 is a schematic block diagram of a first example charge and discharge control apparatus, in accordance with embodiments of the present invention.

Referring now to FIG. 3, shown is a schematic block diagram of a first example charge and discharge control apparatus, in accordance with embodiments of the present invention. In this particular example, the movable power source may include external interface A, charge and discharge management apparatus 200, and battery (BAT) 150. In particular embodiments, the bi-directional charge and discharge management system may include power converter 210 and charge and discharge control circuit 220.

Power converter 210 can include switches (e.g., transistors) K1, K2, K3, and K4, and inductor L. Switch K1 can connect between external interface A and inductor L, and inductor L can connect between switches K1 and K4. Switch K4 can also connect to the battery. Switch K2 can connect between ground and a common node of switch K1 and inductor L. Switch K3 can connect between ground and a common node of inductor L and switch K4. For example, external interface A can be used to couple with external power supply 130 or load 140. External interface A May be used to connect with power supply 130 for charging battery 150, or to connect with load 140 for supplying power to the battery.

For example, load 140 can be connected with external interface A to charge a cell phone or wearable electronic product, such as a head-mounted display (HMD). Battery (BAT) 150 can be any chargeable and dischargeable storage element, such as a lithium battery. Charge and discharge control circuit 220 can be coupled to power converter 210. When external interface A is coupled with power supply 130, charge and discharge control circuit 220 can generate one or more charge switch control signals in order to control the switching states of switches K1, K2, K3, and K4 in power converter 210 such that power converter 210 provides a current to charge battery 150. When external interface A is coupled with load 140, charge and discharge control circuit 220 can generate one or more discharge switch control signals in order to control the switching states of switches K1, K2, K3, and K4 in power converter 210 such that power converter 210 provides a current to load 140.

For example, when external interface A is coupled with power supply 130, voltage VIN of external power supply 130 may charge battery 150 via power converter 210. In such a case, external interface A can be configured as an input terminal of power converter 210, and battery 150 can be configured as an output terminal of power converter 210. There may be various paths of charging battery 150 from voltage VIN of external power 130 supply through power converter 210. For example, battery 150 can be charged via switch K1, inductor L and switch K4. As another example, battery 150 can be charged by storing energy from power supply 130 to inductor L by turning on and switches K1 and K3, and then by charging battery 150 with the energy stored in inductor L by turning on switches K2 and K4. The specific charge mode and selected charging path may be controlled by control circuit 220.

When external interface A is connected with load 140, the voltage of battery 150 can load 140 through power converter 210. In this case, external interface A can be configured as the output terminal of power converter 210, and battery 150 may be configured as the input terminal of power converter 210. Also, there can be various paths of supplying power to load 140 with the battery voltage through power converter 210. The specific discharge (power supply) mode and selected discharging path can be controlled by control circuit 220. In this example, when power supply 130 connects to external interface A, switches K1 and K2 in power converter 210 may form a buck stage, while switches K3 and K4 can form a boost stage. Thus, power converter 210 may operate in boost mode or buck mode when power supply 130 is charging battery 150. Power supply 130 can charge battery 150 by generating a current through power converter 210, regardless of the relationship (e.g., higher or lower) of power supply voltage VIN relative to the battery voltage (Vbat).

When external interface A connects to load 140, switches K1 and K2 in power converter 210 may form a boost stage, and switches K3 and K4 can form a buck stage. Thus, power converter 210 may operate in a boost mode or a buck mode when battery 150 is discharged to load 140. In this way, the battery can supply power to load 140 by generating a current through power converter 210, regardless of the relationship (e.g., higher or lower) of battery voltage Vbat relative to load voltage Vload, in order to meet voltage requirements of the load. Therefore, in certain embodiments, the relationship between the input and output of the power converter is not fixed, but rather is interchangeable such that charge and discharge management apparatus 200 can be used in a wide variety of applications.

Figure 4:
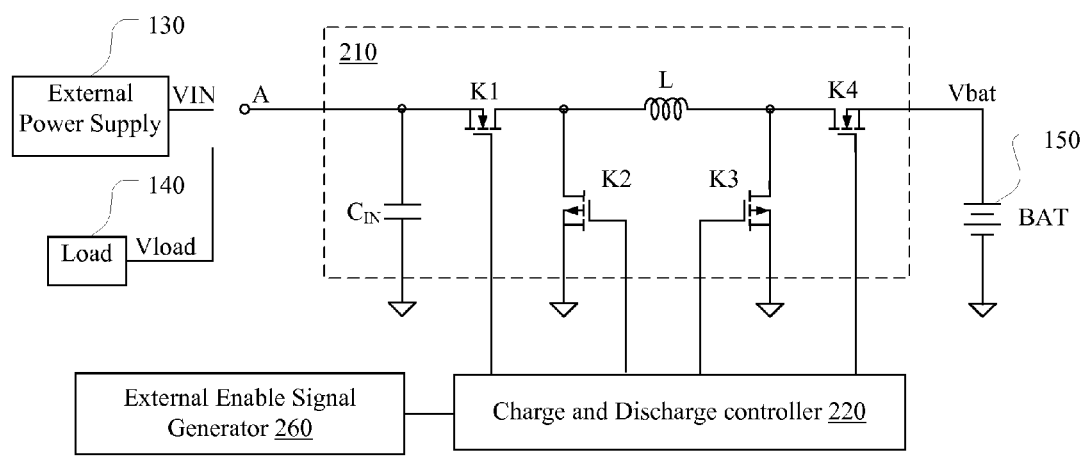
FIG. 4 is a schematic block diagram of a charge and discharge control apparatus, in accordance with embodiments of the present invention.

Referring now to FIG. 4, shown is a schematic block diagram of a charge and discharge control apparatus, in accordance with embodiments of the present invention. In this example, external enable signal generator 260 may be employed as part of charge and discharge management apparatus 200 discussed above with reference to FIG. 3. In this example of FIG. 4, external enable signal generator 260 can connect to charge and discharge control circuit 220 for generating an enable signal to charge and discharge control circuit 220. When the enable signal is active, charge and discharge control circuit 220 can be enabled.

When external interface A is connected with power supply 130, voltage VIN of the power supply can charge battery 150 through power converter 210. In this case, external interface A may be configured as an input terminal of power converter 210, and battery 150 can be configured as an output terminal of power converter 210. Various paths of charging battery 150 with voltage VIN of power supply 130 through power converter 210 can be accommodated. Also, power converter 210 may operate in a boost mode or a buck mode by controlling the switching states of the four switches in power converter 210. For example, battery 150 can be charged via switch K1, inductor L and switch K4. In another example, battery 150 can be charged by storing energy from power supply 130 in inductor L by turning on switches K1 and K3, and then by charging battery 150 with the energy stored in inductor L by turning on switches K2 and K4. The specific charge mode and selected charging path may be controlled by control circuit 220.

When external interface A is connected with load 140, the voltage of battery 150 can charge the load through power converter 210. In this case, external interface A can be configured as the output terminal of power converter 210, and battery 150 can be configured as the input terminal of power converter 210. Also, there may be various paths of supplying power to load 140 with the battery voltage through power converter 210. The specific discharge (power supply) mode and selected discharging path can be controlled by control circuit 220.

External enable signal generator 260 may be configured to generate the enable signal for control circuit 220. For example, when the enable signal is active, control circuit 220 may be enabled for normal operation, and the interface detection circuit can determine if external interface A is coupled with power supply 130 or load 140. When a power supply is detected, the interface detection circuit can activate a charge signal for enabling a charge control circuit. The charge control circuit may activate a charge switch control signal in order to control the switching states of switches K1, K2, K3, and K4 of power converter 210 such that the power converter may provide a current to battery 150. When a load is detected, the interface detection circuit can activate a discharge signal for enabling a discharge control circuit. The discharge control circuit can activate a discharge switch control signal in order to control the switching states of switches K1, K2, K3, and K4 of power converter 210 such that the power converter may generate a current to load 140.

Therefore, in particular embodiments, when the power supply connects to external interface A, power converter 210 may operate in boost or buck mode, regardless of the voltage relationship of the power supply voltage relative to the battery voltage, when the power supply is charging the battery through the power converter. When load 140 connects to external interface A, the power converter may operate in boost or buck mode, regardless of the voltage relationship of the battery voltage relative to the load voltage, when the battery is discharged to load 140 through the power converter. Therefore, the relationship between the input and the output of the power converter is not fixed, but rather is interchangeable such that charge and discharge management apparatus 200 can be utilised in a variety of applications.

Figure 5:
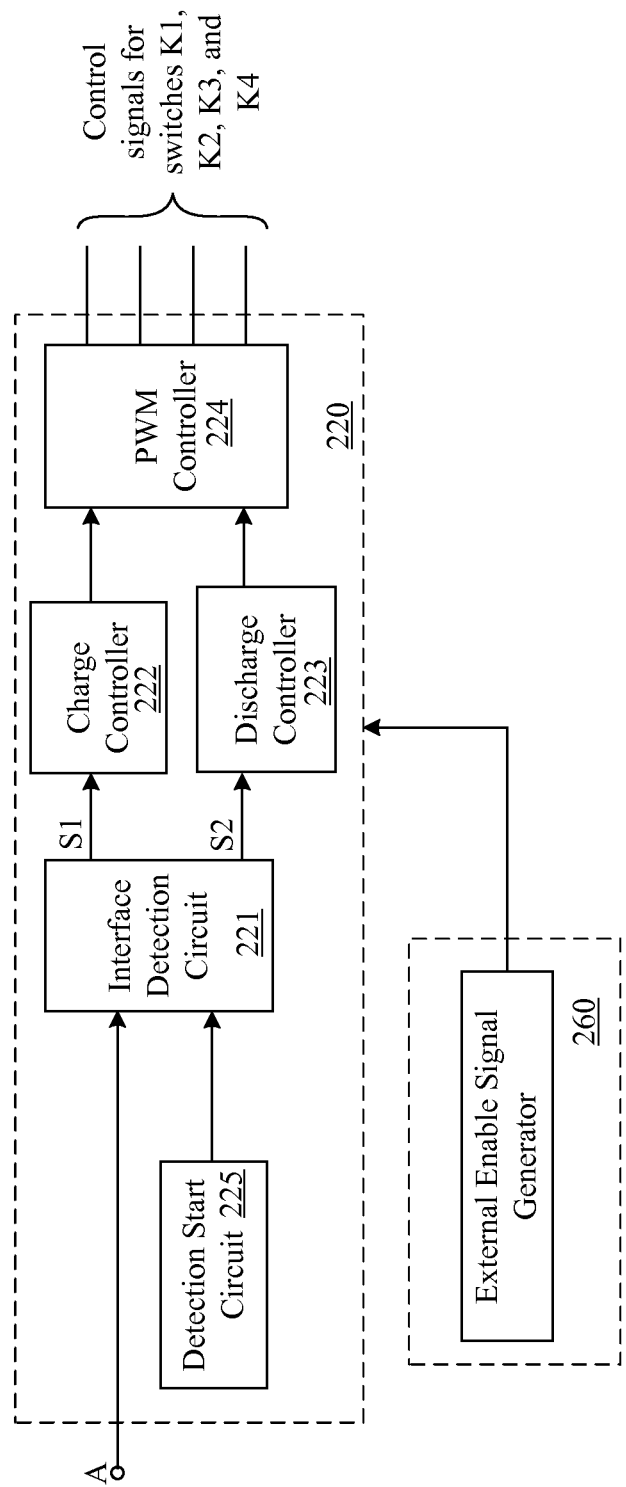
FIG. 5 is a schematic block diagram of an example charge and discharge controller, in accordance with embodiments of the present invention.

Referring now to FIG. 5, shown is a schematic block diagram of an example charge and discharge controller, in accordance with embodiments of the present invention. Charge and discharge control circuit/controller 220 can include interface detection circuit 221, charge controller 222, and discharge controller 223. Interface detection circuit 221 can be used to detect if external interface A is coupled with a power supply (e.g., 130) or a load (e.g., 140), and to generate detection signals S1 and S2. For example, detection signal S1 may be used to enable charge controller 222, and detection signal S2 may be used to enable discharge controller 223.

If the power supply is detected, detection signal S1 can be active and detection signal S2 may be inactive such that charge controller 222 is enabled in order to generate one or more charge switch control signals for controlling the switching states of switches K1, K2, K3, and K4 of power converter 210 such that the power converter may provide a current to battery 150. Otherwise, if load 140 is detected, detection signal S2 can be active and detection signal S1 may be inactive such that discharge control circuit 223 is enabled in order to generate one or more discharge switch control signal for controlling the switching states of switches K1, K2, K3, and K4 of power converter 210 such that the power converter may provide a current to the load. Charge and discharge controller 220 may also include pulse-width modulation (PWM) controller to receive charge and discharge control signals, and to generate one or more PWM signals. For example, control signals can be provided to the gates of switches K1, K2, K3, and K4 of power converter 210 to appropriately control these switches.

When charge control circuit 222 is enabled, the charge mode may be selected as a first, second, or third charge mode. In the first charge mode, when external interface A is coupled to power supply 130, charge controller 222 may activate one or more charge control signals to turn on switches K1 and K3 for a first predetermined time period, and to turn on switches K2 and K4 for a second predetermined time period. For example, the first and second time periods can be two alternant time periods. Specifically, switches K1 and K3 may be turned on, and switches K2 and K4 can initially be turned off, and then switches K1 and K3 can be turned off, such that switches K1, K3, K2, and K4 are turned on alternately.

In the second charge mode, when external interface A is coupled to power supply 130, charge controller 222 may activate one or more charge control signals to turn on switches K1 and K3 for a first predetermined time period, to turn on switches K1 and K4 for a second predetermined time period, and to turn on switches K2 and K4 for a third predetermined time period. For example, the first, second, and third predetermined time periods can be three alternant time periods. As used herein, "alternate time periods" can indicate separate and substantially non-overlapping time periods that together form a full cycle or period such that only one of the separate time periods are occurring at a given point in time.

In the third charge mode, when external interface A is coupled to external power supply 130, and when the external power supply voltage is greater than a first threshold value, switch K4 can remain on, and switch K3 can remain off. Also, switch K1 can be turned on for a first predetermined time period, and switch K2 can be turned on for a second predetermined time period. For example, the first and second predetermined time periods can be two alternant time periods. When the external power supply voltage is less than a second threshold value, switch K1 can remain on and switch K2 can remain off. Also, switch K3 can be turned on for a third predetermined time period, and switch K4 can be turned on for a fourth predetermined time period. For example, the third and fourth predetermined time periods can be two alternant time periods.

When the external power supply is greater than the first threshold value but less than the second threshold value, switches K1 and K3 can be turned on for a fifth predetermined time period. Also, switches K1 and K4 can be turned on for a sixth predetermined time period, and switches K2 and K4 can be turned on for a seventh predetermined time period. For example, the fifth, sixth, and seventh predetermined time periods can be three alternant time periods. Also for example, the first threshold value may be a sum of a battery voltage and a first preset threshold value, and the second threshold value may be a difference between the battery voltage and a second preset threshold value.

The charge mode can be selected based on a relationship between power supply voltage VIN and battery voltage Vbat. For example, when VIN>>Vbat (e.g., the power supply voltage is much greater than a sum of the battery voltage and a first preset threshold value), switch K3 can remain off, switch K4 can remain on, and switches K1 and K2 may be alternately turned on. That is, switches K1 and K4 can be turned on, or switches K2 and K4 can be turned on. When VIN<<Vbat (e.g., the power supply voltage is less than a difference between the battery voltage and a second preset threshold value), switch K2 can remain off and switch K1 can remain on, and switches K3 and K4 may alternately be turned on. That is, switches K1 and K3 can be turned on, or switches K1 and K4 can be turned on. When VIN≠Vbat (e.g., the power supply voltage is between a first threshold value and a second threshold value), the charge mode can be divided into three sections: K1, K3 to K1, K4 to K2, K4. For example, the first threshold value may be a sum of the battery voltage and a first preset threshold value, and the second threshold value can be a difference between the battery voltage and a second preset threshold value.

The specific discharge mode may not be fixed, but rather it can be matched with the selected charge mode. In a first discharge mode, when external interface A connects to load 140, discharge controller 223 can generate one or more discharge control signals to turn on switches K2 and K4 for a first predetermined time period, and to turn on switches K1 and K3 for a second predetermined time period. For example, the first and second predetermined time periods can be two alternant time periods.

In a second discharge mode, when external interface A is coupled to load 140, discharge controller 223 can generate one or more discharge control signals to turn on switches K2 and K4 for a first predetermined time period, to turn on switches K1 and K4 for a second predetermined time period, and to turn on switches K1 and K3 for a third time period, for example the first predetermined time period. For example, the first, second, and third predetermined time periods can be three alternant time periods.

In a third discharge mode, when external interface A is coupled to the load, and when the battery voltage is greater than a first threshold value, switch K1 can remain on, and switch K2 can remain off. Also, switch K4 can be turned on for a first predetermined time period, and switch K3 can be turned on for a second predetermined time period. For example, the first and second predetermined time periods can be two alternant time periods. When the battery voltage is less than a second threshold value, switch K4 can remain on and switch K3 can remain off. Also, switch K2 can be turned on for a third predetermined time period and switch K1 can be turned on for a fourth predetermined time period. For example, the third and fourth predetermined time periods can be two alternant time periods.

When the battery voltage is greater than the first threshold value but less than the second threshold value, switches K2 and K4 can be turned on for a fifth predetermined time period. Also, switches K1 and K4 can be turned on for a sixth predetermined time period, and switches K1 and K3 can be turned on for a seventh predetermined time period. For example, the fifth, sixth, and seventh predetermined time periods may be three alternant time periods. Also for example, the first threshold value can be a sum of a load voltage and a first preset threshold value, and the second threshold value may be a difference between the load voltage and a second preset threshold value.

Charge and discharge control circuit 220 further can also include detection start circuit 225 that can generate a starting signal for controlling interface detection circuit 221. For example when the starting signal is active, interface detection circuit 221 can be enabled to detect whether external interface A is connected to a power supply or a load. When battery 150 is supplying power to load 140 through power converter 210, the starting signal can be activated if charge and discharge management apparatus 200 remains in a sleep mode for a predetermined time. In this way, interface detection circuit 221 can be enabled to detect if the external interface is coupled to a power supply or a load.

When power supply 130 charges battery 150 through power converter 210, the starting signal may be active if the voltage at external interface A is less than a preset voltage. In this way, interface detection circuit 221 can be enabled to detect if the external interface is coupled to a power supply or a load. When the enable signal goes from active to inactive, the starting signal can be activated in order to enable interface detection circuit 221 to detect if the external interface is coupled to a power supply or a load.

In addition, switches K1, K2, K3, and K4 as shown in the examples herein can be any type of transistors. For example, P-type metal oxide semiconductor field effect transistor (PMOS) or N-type metal oxide semiconductor field effect transistor (NMOS) can be employed. Also, different types of transistors can be used for different switches, such as switches K1 and K4 being PMOS transistors, while switches K2 and K3 can be NMOS transistors.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
    a) a first switch coupled to an external interface and an inductor;
    b) a second switch coupled to ground and a common node between said first switch and said inductor;
    c) a third switch coupled to ground and a common node between said inductor and a fourth switch, wherein said inductor and first, second, third, and fourth switches form a power converter;
    e) an interface connection circuit configured to detect whether a power supply or a load is coupled to said external interface, wherein said interface detection circuit is configured to activate a charge signal to enable a charge control circuit when said power supply is detected, and to generate a discharge signal for enabling a discharge control circuit when said load is detected; and
    f) a chargeable battery coupled to said fourth switch, wherein said charge control circuit is configured to generate one or more charge switch control signals to control said first, second, third, and fourth switches such that said power converter is configured to provide a current to said battery when said external interface is coupled to said power supply, and wherein said discharge control circuit is configured to generate one or more discharge switch control signals to control said first, second, third, and fourth switches such that said power converter is configured to provide a current to said load when said external interface is coupled to said load.

2. The apparatus of claim 1, wherein when said external interface is coupled to said external power supply:
    a) said first and third switches are configured to be turned on for a first predetermined time period; and
    b) said second and fourth switches are configured to be turned on for a second predetermined time period, wherein said first and second predetermined time periods are two alternant time periods.

3. The apparatus of claim 1, wherein said external interface is coupled to said external power supply:

a) said first and third switches are configured to be turned on for a first predetermined time period;
b) said first and fourth switches are configured to be turned on for a second predetermined time period; and
c) said second and fourth switches are configured to be turned on for a third predetermined time period, wherein said first, second, and third predetermined time periods are three alternant time periods.

4. The apparatus of claim 1, wherein:
a) when said external interface is coupled to said external power supply, and when said external power supply voltage is greater than a first threshold value, said fourth switch is configured to remain on, said third switch is configured to remain off, said first switch is configured to be turned on for a first predetermined time period, and said second switch is configured to be turned on for a second predetermined time period, wherein said first and second predetermined time periods are two alternant time periods;
b) when said external power supply voltage is less than a second threshold value, said first switch is configured to remain on, said second switch is configured to remain off, said third switch is configured to be turned on for a third predetermined time period, and said fourth switch is configured to be turned on for a fourth predetermined time period, wherein said third and fourth predetermined time periods are two alternant time periods; and
c) when said external power supply is greater than said first threshold value and less than said second threshold value, said first and third switches are configured to be turned on for a fifth predetermined time period, said first and fourth switches are configured to be turned on for a sixth predetermined time period, and said second and fourth switches are configured to be turned on for a seventh predetermined time period, wherein said fifth, sixth, and seventh predetermined time periods are three alternant time periods, wherein said first threshold value comprises a sum of a battery voltage and a first preset threshold value, and wherein said second threshold value comprises a difference between said battery voltage and a second preset threshold value.

5. The apparatus of claim 1, wherein when said external interface is coupled to said load:
a) said second and fourth switches are configured to be turned on for a first predetermined time period; and
b) said first and third switches are configured to be turned on for a second predetermined time period, wherein said first and second predetermined time periods are two alternant time periods.

6. The apparatus of claim 1, wherein when said external interface is coupled to said load:
a) said second and fourth switches are configured to be turned on for a first predetermined time period;
b) said first and fourth switches are configured to be turned on for a second predetermined time period; and
c) said first and third switches are configured to be turned on for a third predetermined time period, wherein said first, second, and said third predetermined time periods are three alternant time periods.

7. The apparatus of claim 1, wherein:
a) when said external interface is coupled to said load, and when said battery voltage is greater than a first threshold value, said first switch is configured to remain on, said second switch is configured to remain off, said fourth switch is configured to be turned on for a first predetermined time period, and said third switch is configured to be turned on for a second predetermined time period, wherein said first and second predetermined time periods are two alternant time periods;
b) when said battery voltage is less than a second threshold value, said fourth switch is configured to remain on, said third switch is configured to remain off, said second switch is configured to be turned on for a third predetermined time period, and said first switch is configured to be turned on for a fourth predetermined time period, wherein said third and fourth predetermined time periods are two alternant time periods; and
c) when said battery voltage is greater than said first threshold value and less than said second threshold value, said second and fourth switches are configured to be turned on for a fifth predetermined time period, said first and fourth switches are configured to be turned on for a sixth predetermined time period, and said first and third switches are configured to be turned on for a seventh predetermined time period, wherein said fifth, sixth, and seventh predetermined time periods are three alternant time periods, wherein said first threshold value comprises a sum of a load voltage and a first preset threshold value, and wherein said second threshold value comprises a difference between said load voltage and a second preset threshold value.

8. The apparatus of claim 1, further comprising an external enable signal generator configured to generate an enable signal to control enabling of said charge and discharge control circuits.

9. The apparatus of claim 1, further comprising a pulse-width modulation (PWM) control circuit configured to receive said one or more charge switch control signal and said one or more discharge switch control signals, and to generate one or more PWM signals to control said first, second, third, and fourth switches.

10. The apparatus of claim 1, further comprising a detection start circuit configured to generate a starting signal for controlling said interface detection circuit, wherein said interface detection circuit is enabled to detect whether said external interface is coupled to said power supply or said load when said starting signal is active.

11. A movable power source, comprising the apparatus of claim 1, and wherein a portable electronic device is configured as said load.

* * * * *